US009710343B2

(12) United States Patent
Petersen (10) Patent No.: US 9,710,343 B2
(45) Date of Patent: Jul. 18, 2017

(54) POWER FAIL CIRCUIT FOR MULTI-STORAGE-DEVICE ARRAYS

(71) Applicant: Facebook, Inc., Menlo Park, CA (US)

(72) Inventor: Christian Markus Petersen, Cedar Park, TX (US)

(73) Assignee: Facebook, Inc., Menlo Park, CA (US)

( * ) Notice: Subject to any disclaimer, the term of this patent is extended or adjusted under 35 U.S.C. 154(b) by 119 days.

(21) Appl. No.: 14/670,758

(22) Filed: Mar. 27, 2015

(65) Prior Publication Data

US 2016/0283336 A1 Sep. 29, 2016

(51) Int. Cl.
*G06F 11/00* (2006.01)
*G06F 11/20* (2006.01)
*G06F 1/30* (2006.01)
*G06F 11/30* (2006.01)

(52) U.S. Cl.
CPC ............ *G06F 11/2015* (2013.01); *G06F 1/30* (2013.01); *G06F 11/3034* (2013.01); *G06F 11/3058* (2013.01)

(58) Field of Classification Search
USPC .......................................................... 714/24
See application file for complete search history.

(56) References Cited

U.S. PATENT DOCUMENTS

| 6,993,680 B2 * | 1/2006 | Fukumori | G06F 1/30 368/228 |
| 2002/0152425 A1 * | 10/2002 | Chaiken | G06F 11/0793 714/23 |
| 2012/0210169 A1 * | 8/2012 | Coile | G06F 11/2092 714/22 |
| 2014/0359356 A1 * | 12/2014 | Aoki | G06F 11/1441 714/24 |
| 2016/0149495 A1 * | 5/2016 | Berke | H02M 3/33507 363/21.12 |

* cited by examiner

*Primary Examiner* — Sarai Butler
(74) *Attorney, Agent, or Firm* — Perkins Coie LLP (57) ABSTRACT

Some embodiments include a multi-storage-device array (e.g., a SSD tray, a SSD sled or a SSD rack) having multiple drives (e.g., solid-state drives). The multi-storage-device array can have an enclosure around the drives, a processor and a network interface, and implement a power failure management circuit. The power failure management circuit can include an electric probe that detects a power failure. Upon detecting the power failure, the power failure management circuit sends an interrupt signal to a drive controller to flush data in volatile-memory (e.g., write cache, firmware cache, look-up table cache, or other random access memory) into non-volatile memory (e.g., flash memory). The power failure management circuit can include a system-level holdup energy storage that retains power after power failure to support flushing of the data from the volatile memory during the power failure.

20 Claims, 4 Drawing Sheets

POWER FAIL CIRCUIT FOR MULTI-STORAGE-DEVICE ARRAYS

BACKGROUND

Multi-storage-device arrays can take the form of a tray, a sled, a rack, a cabinet, etc. These arrays can host multiple data storage devices (e.g., one or more solid state drives, one or more hard disk drives, one or more tape drives, or any combination thereof, also referred to herein as simply "storage devices") and a central system of shared components. For example, a processor that implements a data service enabling clients to access to the storage devices. A client is a consumer of the data service, and can execute at one or more client computing devices. The controller can access the storage devices as independent drives by communicating with storage controllers in the storage devices through respective storage adapters. The central system can further include a central network interface, a central volatile memory space, and a central power interface. Sharing a central system (e.g., a central controller, a central network interface, a central power interface, a central volatile memory space, etc.) among the storage devices conserve electronic resources. Using these centralized components further enables the storage space of the multi-storage-device to flexibly expand or contract without needing to add additional supportive components (e.g., an additional network interface, power interface, etc.)

Multi-storage-device arrays can be subject to power failures. For example, a power failure can be due to power grid outage, hardware failure, or man-made mistakes (e.g., an information technology (IT) technician pulling a storage device out of the array or pulling the array out of a system having multiple arrays). When writing large amount (also, "chunk") of information into a single storage device, the write-speed of the storage device may be insufficient to accommodate a synchronous write relative to the data transfer speed via the storage adapters. Accordingly, storage devices may include a write cache. A write cache generally comprises data storage that has much faster transfer speeds than other types of data storage devices. Write caches typically use volatile memory. Thus, during a power failure event, unless a specific instruction to flush the write cache is given, the write cache can lose data when experiencing the power failure event.

Some brands of storage devices have proprietary power failure recovery mechanisms. However, these power failure recovery mechanisms differ from one brand to another. Also, not all storage devices, including ones with attributes that are desirable for a multi-storage-device array, have a power failure recovery mechanism. This presents a challenging problem when storage devices are selected based on those desirable attributes, leaving the multi-storage-device array with at least a subset of its storage devices (e.g., storage "drives") without power failure recovery mechanisms. Moreover, storage devices having power failure recovery mechanisms tend to be more expensive than those not having such mechanisms.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Several embodiments include a multi-storage-device array (e.g., a storage device tray, a storage device sled, a storage device rack) with a system-level power failure management circuit. The multi-storage-device array includes multiple storage devices. The storage devices can include one or more of solid-state drives (SSDs), hard disk drives (HDs), tape drives, or other non-volatile storage drives. The multi-storage-device array can have an enclosure protecting the storage devices, a central processor (e.g., single core processor or multi-core processor), a network interface, and a switching network (e.g., a serial attached small computer system interface (SAS) expander or a referral component interface express (PCIe) switch). The central processor can access the storage devices as "storage drives." The multi-storage-device array can provide, via the network interface, a data storage service for clients to read and write data to its storage drives.

As a system, the multi-storage-device array can implement a power failure management circuit. The power failure management circuit can detect power failure event at system-level of the multi-storage-device array. In some embodiments, the power failure management circuit can also detect power failure events that affect only a subset of the storage devices. The power failure management circuit can also execute a data protection process at the system-level. The power failure management circuit can include an electric probe (e.g., a voltage comparator or a current meter) that determines whether a power supply (e.g., for the entire system or part of the system) is functioning abnormally. In some embodiments, the power failure management circuit includes multiple electric probes, each of which respectively determines whether power supplied to each of the drives is functioning abnormally. Abnormal functioning can be characterized by electrical current and/or voltage being above a maximum threshold or below a minimum threshold. Abnormal functioning of a power supply (e.g., the system-level power supply to the array) or power delivery mechanism (e.g., powertrain to a storage device) can be considered to be a power failure event.

A system-level controller (e.g., a controller dedicated to the power failure management circuit or the central processor of the multi-storage-device array) can monitor sensor readings from the one or more electric probes and detect a power failure event based on the sensor readings. The system-level controller can generate and send a maximum priority command to all or a subset of the drives to flush data from volatile-memory (e.g., a write cache, a firmware cache, a look-up table cache, metadata or front end processing cache or other random access memory) to non-volatile/persistent memory (e.g., flash memory). In some embodiments, the system-level controller selects the subset of the drives to send the maximum priority command based on whether the selected drives are affected by the power failure event. When the power failure event is system-wide, the system-level controller sends the maximum priority command to all of the drives. In some embodiments, the system-level controller selects the subset of the drives based on whether the selected drives have drive-level power failure protection (e.g., backup capacitor, battery, and/or data protection/redundancy). In some embodiments, the system-level controller selects the subset based on whether the selected drives are affected and whether the affected drives have drive level power failure protection.

The power failure management circuit can include one or more holdup energy storages (e.g., one or more batteries or capacitors) that retain power after a power failure event to support flushing of the data from the volatile memory during the power failure event. In some embodiments, responsive to detecting the power failure event and prior to sending the maximum priority command, the system-level controller powers off other components (e.g., other than the drives receiving the flushing command) in the multi-storage-device array to reduce power drained from the energy storage and to prevent any further write commands/requests into the drives.

Figure 1:
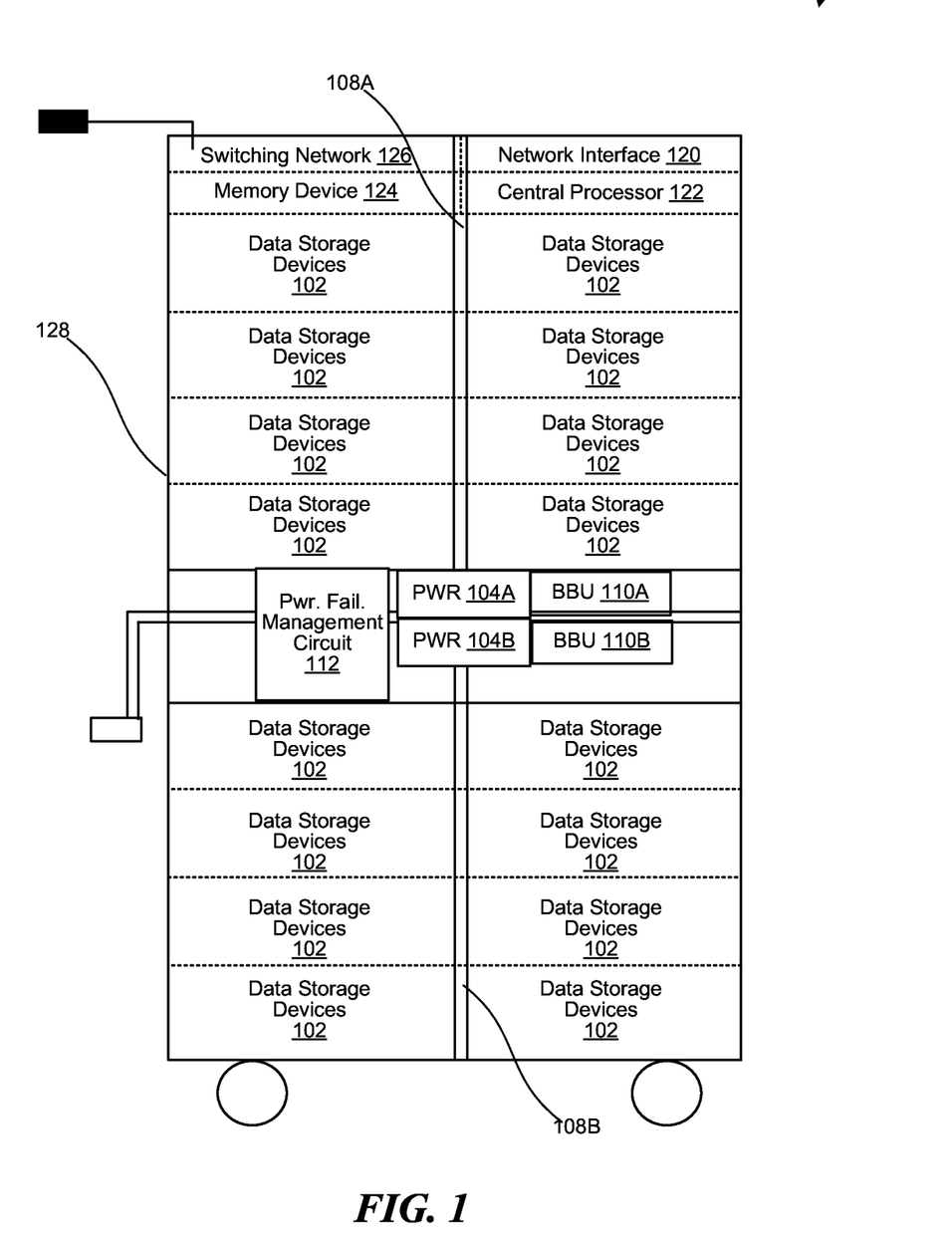
FIG. 1 is a block diagram illustrating a multi-storage-device array with a power failure management mechanism, in accordance with various embodiments.

Turning now to the figures, FIG. 1 is a block diagram illustrating a multi-storage-device array 100 with a power failure management mechanism, in accordance with various embodiments. The multi-storage-device array 100 includes two or more data storage devices 102. The multi-storage-device array 100 can be a tray, a cabinet, a sled, or other enclosures having multiple storage devices sharing data processing components. The data storage devices 102 can be one or more of solid-state drives, hard disk drives, tape drives, or other data storage devices (e.g., non-volatile data storage drives).

The multi-storage-device array 100 can share one or more power modules (e.g., a power supply module 104A, a power supply module 104B, etc., collectively as the "power supply modules 104"). The power supply modules 104 can be connected to a power grid to provide power to components of the multi-storage-device array 100. For example, the power supply module 104A can convert three phase alternating current (AC) from the power grid to a powertrain 108A (e.g., a direct current (DC) powertrain) to at least a subset of the data storage devices 102 and the power supply module 104B can convert three phase AC from the power grid to a powertrain 108B (e.g., a DC powertrain). The multi-storage-device array 100 can share one or more backup battery units (BBU) (e.g., a BBU 110A, a BBU 110B, etc., collectively as the "BBU 110").

The multi-storage-device array 100 can include a power failure management circuit 112. The power failure management circuit 112 can be a system-level circuit that manages detection of power failure events and data protection responsive to the power failure events.

Other than the power related components described above, the multi-storage-device array 100 can include a number of central components that are shared and/or coupled to the data storage devices 102. For example, the multi-storage-device array 100 can include a network interface 120, a central processor 122, a memory device 124, a switching network 126, or any combination thereof.

The network interface 120 enables the central processor 122 to communicate with external clients (e.g., other computing devices connected to the multi-storage-device array 100 via a network (e.g., a wireless or a wired network). The network can be a local area network (LAN) or a wide area network (WAN). In some embodiments, the network interface 120 is configured to facilitate communication amongst the data storage devices 102. In some embodiments, the switching network 126 is configured to facilitate communication amongst the central processor 122, the data storage devices 102, and/or the power failure management circuit 112. In some embodiments, the network interface 120 is configured to facilitate communication amongst the data storage devices 102, the central processor 122, and/or the power failure management circuit 112.

The central processor 122 can be configured to process communication between the external clients and the data storage devices 102. For example, the central processor 122 can implement an operating system that mounts the data storage devices 102 as its storage drives. The central processor 122 can execute a client service process on the operating system to read or write from one or more of the data storage devices 102 based on client requests from the external clients. The memory device 124 can provide runtime memory for the operating system and/or other applications running thereon (e.g., the client service process).

The multi-storage-device array 100 includes an enclosure 128. The enclosure 128 provides physical structure to the multi-storage-device array 100. The enclosure 128 can form the shape of a tray, sled, a rack, or any combination thereof. The enclosure 128 can substantially surround the data storage devices 102, the power related components, the central components that are shared/coupled to the data storage devices 102, or any combination thereof. The enclosure 128 can be adapted with cavities therein to support the data storage devices 102. These cavities can enable convenient insertion and extraction of the data storage devices 102 (e.g., via quick release mechanisms that enable a single external motion to trigger release of a device). Similarly, the enclosure 128 can be adapted with cavities therein to support, insert, or extract the central components. The enclosure 128 can be adapted with cavities therein for running the powertrain 108A or the powertrain 108B.

Figure 2:
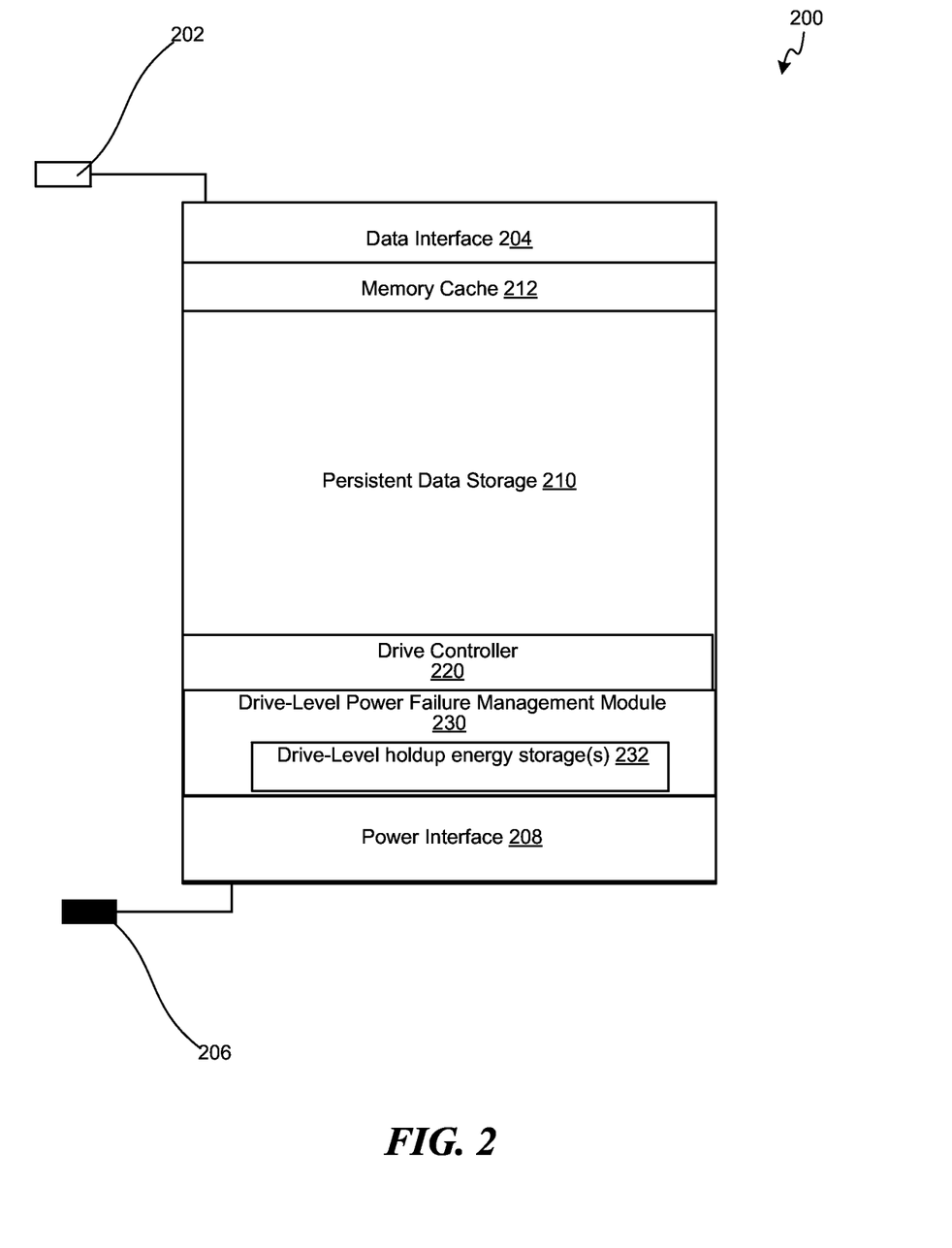
FIG. 2 is a block diagram illustrating a storage device within a multi-storage-device array, in accordance with various embodiments.

FIG. 2 is a block diagram illustrating a data storage device 200 within a multi-storage-device array (e.g., the multi-storage-device array 100 of FIG. 1), in accordance with various embodiments. The data storage device 200 can be one of the data storage devices 102 of FIG. 1. The data storage device 200 can be coupled to other components of the multi-storage-device array via a data connection 202 (e.g., a detachable data bus) coupled to a data interface 204. The data interface 204 can be part of the data storage device 200. The data connection 202, in turn, can be coupled to a storage device adapter (e.g., in the multi-storage-device array) and/or a switching network (e.g., the switching network 126 of FIG. 1) that communicates with a central processor of the multi-storage-device array.

The data storage device 200 can be powered by a power line 206 (e.g., a branch of the powertrain 108A or the powertrain 108B) coupled to a power interface 208. The power interface 208 can be part of the data storage device 200. The power interface 208 can include a passive socket for plugging in the power line 206. The power interface 208 can also include an active circuitry for converting power to a particular power configuration (e.g., a certain electrical voltage) required by one or more functional components of the data storage device 200. In some embodiments, the power interface 208 can include different active circuitries for converting power according to different configurations for different functional components of the data storage device 200.

The data storage device 200 includes a persistent data storage 210 (e.g., flash memory, magnetic disks, magnetic tapes, etc.) and a memory cache 212. The persistent data storage 210 can retain its data without power. The memory cache 212, on the other hand, cannot retain its data without power. The data storage device 200 can include a drive controller 220 for managing data access requests and control commands received at the data interface 204 for data stored or to be stored in the persistent data storage 210. To alleviate data clogging and/or bottlenecking when writing data from the data interface 204 into the persistent data storage 210, the drive controller 220 can utilize the memory cache 212 as a staging area for writing client data into the persistent data storage 210. The memory cache 212 can also store metadata (e.g., data storage front-end metadata), firmware, and/or lookup tables. In some instances, the drive controller 220 can also use the memory cache 212 as an output buffer before sending data over the data interface 204 to other components of the multi-storage-device array.

In some instances, the data storage device 200 can include a drive-level power failure management module 230 and/or one or more drive-level holdup energy storages 232 (e.g., one or more batteries or capacitors). The drive-level power failure management module 230 can detect power failure events within the data storage device 200 and execute one or more data protection commands to safeguard data in the memory cache 212 from being erased during the power failure event. The drive-level holdup energy storages 232 can provide power to components within the data storage device 200 after a power failure event occurs to enable the data protection commands to be executed.

The drive-level power failure management module 230 can be a proprietary power failure management circuit designed specifically for one type of data storage device. In several embodiments, the multi-storage-device array may include multiple data storage devices that have different power failure management modules. In some cases, a failed storage device having a drive-level power failure management module in the multi-storage-device array may be replaced by a new storage device without a drive-level power failure management module. Vice versa, in some cases, a failed storage device without a drive-level power failure management module in the multi storage device array may be replaced by a new storage device having a drive-level power failure management module.

The system-level power failure management circuit (e.g., the power failure management circuit 112 of FIG. 1) advantageously provides prevent data loss during power failure events for all client data in its data storage devices without being restricted to using storage devices having drive-level power failure management modules. This increases the flexibility of the multi-storage-device array by enabling any storage device to be inserted into the multi-storage-device array without first vetting whether or not it has a drive-level power failure management module.

Figure 3:
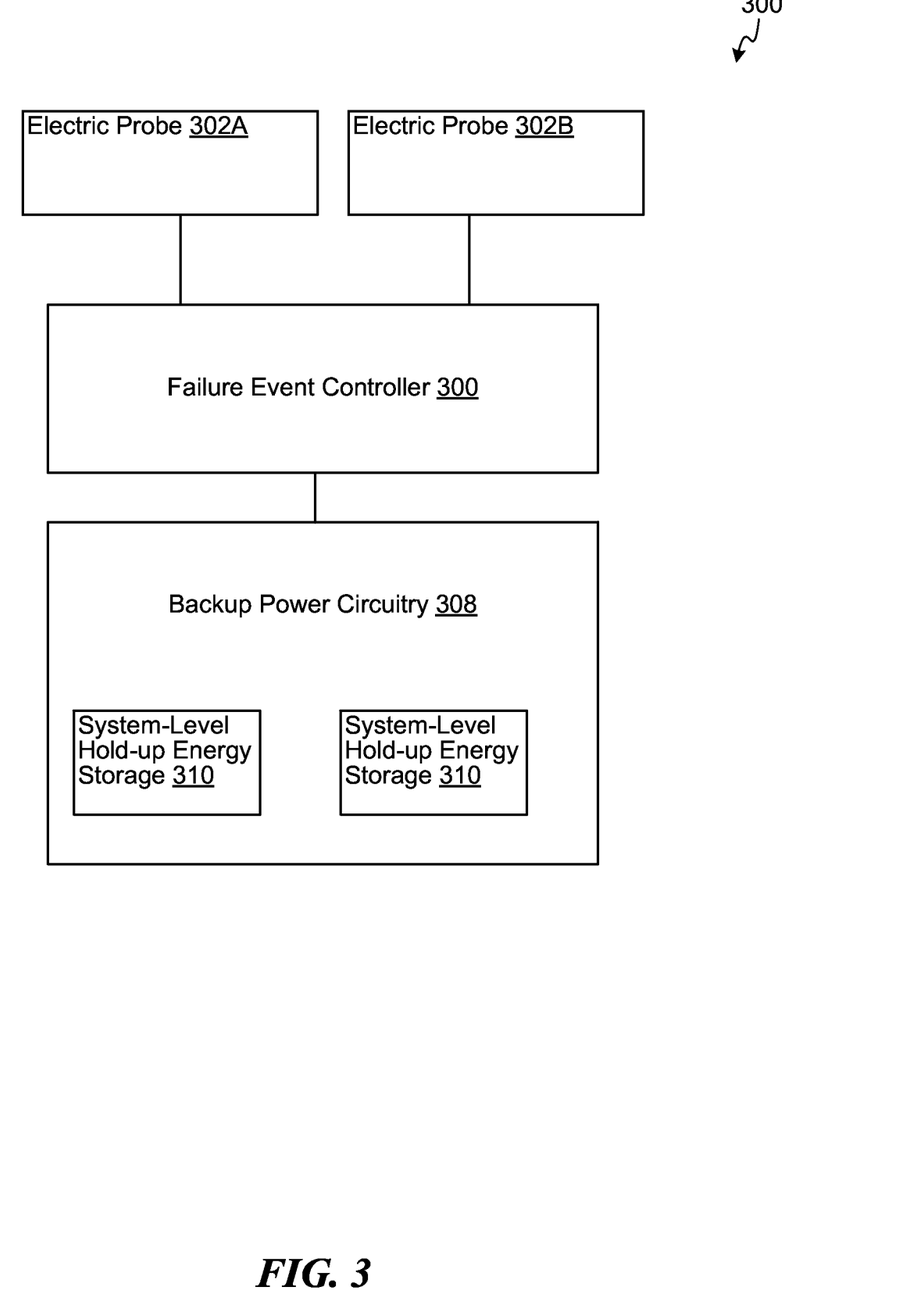
FIG. 3 is a block diagram of a power failure management circuit within a multi-storage-device array, in accordance with various embodiments.

FIG. 3 is a block diagram of a power failure management circuit 300 within a multi-storage-device array (e.g., the multi-storage-device array 100 of FIG. 1), in accordance with various embodiments. The power failure management circuit 300 includes one or more electric probes (e.g., an electric probe 302A, an electric probe 302B, etc., collectively as the "electric probes 302"). For example, the electric probe 302A or the electric probe 302B can be electrically coupled to a powertrain for a subset of data storage devices of the multi-storage-device array or a powertrain specifically for a single data storage device in the multi-storage-device array. For example, the electric probe 302A or the electric probe 302B can be electrically coupled to a power supply module (e.g., a central power supply of the multi-storage-device array) in the multi-storage-device array. As another example, the electric probe 302A or the electric probe 302B can be electrically coupled to a power intake line, drawing power from an external power grid, of the multi-storage-device array. As another example, the electric probe 302A or the electric probe 302B can be electrically coupled to a BBU of the multi-storage-device array.

In some embodiments, the power failure management circuit 300 includes a satellite controller as a failure event controller 304. In other embodiments, the power failure management circuit 300 can utilize a central/main processor (e.g., the central processor 122 of FIG. 1) of the multi-storage-device array as the failure event controller 304. The failure event controller 304 is configured to execute the power failure management processes described in this disclosure.

In some embodiments, the power failure management circuit 300 includes a failure event parameter setting 306. The failure event parameter setting 306 can include one or more models or thresholds for determining whether a sensor reading or a series of sensor readings from one of the electric probes constitute a type of power failure event. Different threshold(s) or model(s) can correspond to different types of power failure events (e.g., an open circuit, a short circuit, or an impending power failure). The failure event parameter setting 306 can include one or more parameters describing the shutdown priority and/or order of components within the multi-storage-device array corresponding to one type of power failure event.

In some embodiments, the power failure management circuit 300 includes a backup power circuitry 308. The backup power circuitry 308 can include one or more system-level holdup energy storages 310 (e.g., capacitors or batteries). The backup power circuitry 308 can be configured to provide backup power to the storage devices of the multi-storage-device array. The system-level holdup energy storages 310 are capable of providing power to one or more specific target storage devices or all of the storage devices when the input power supply loses power. The system-level holdup energy storages 310 can be part of the power failure management circuit 300 or external to the power failure management circuit 300. The power failure management circuit 300 can be configured to divert power from the system-level holdup energy storages 310 to the target storage devices without diverting power to one or more non-essential components (e.g., components other than the target storage devices and the power failure management circuit 300) of the multi-storage-device array when the input power supply is functioning abnormally.

Capacitance of the system-level holdup energy storages 310 can be adapted to be sufficient to sustain all of the storage devices to flush potentially all data respectively from their volatile memories to their persistent memories. The system-level holdup energy storages 310 can provide power to one or more components within the multi-storage-device array after a power failure event occurs to enable one or more data protection commands to be executed by the failure event controller 304.

For example, the failure event controller 304 can monitor the sensor readings from the electric probes 302 to determine whether one or more power related components have failed (e.g., flagging the beginning of a power failure event). The failure event controller 304 can determine what type of power failure event is occurring and identify which of the functional components of the multi-storage-device array are affected by the power failure event. In some embodiments, based on the power failure event type and the identified functional components that are affected, the failure event controller 304 can determine a schedule of shutdown sequence for one or more functional components of the multi-storage-device array.

The electric probes can include a voltage comparator at an input power supply of the multi-storage-device array. The failure event controller 304 can be configured to detect a change in a voltage drop across terminals of the input power supply or whether the voltage drop exceeds a voltage threshold (e.g., maximum or minimum threshold). The electric probes can include a current meter at the input power supply. The failure event controller 304 can be configured to detect a change in an electrical current drawn from the input power supply or whether the electrical current exceeds a current threshold (e.g., maximum or minimum threshold).

The failure event controller 304 can be configured to determine whether any of one or more powertrains to the storage drives is functioning abnormally. The electric probes can include a voltage comparator at a powertrain of a storage drive within the multi-storage-device array. The power failure management circuit can be configured to detect a change in a voltage drop across terminals of the powertrain or whether the voltage drop exceeds a voltage threshold (e.g., maximum or minimum threshold). The electric probes can include a current meter at a powertrain to a storage drive within the multi-storage-device array. The failure event controller 304 can be configured to detect a change in an electrical current drawn from the powertrain or whether the electrical current exceeds a current threshold (e.g., maximum or minimum threshold).

In some embodiments, the failure event controller 304 can generate one or more interrupt commands to data storage devices affected by the power failure event. An interrupt command is a signal to a storage device controller (e.g., the drive controller 220 of FIG. 2) indicating an event that needs immediate attention under high-priority or highest priority (e.g., requiring the interruption of the current code the processor is executing). The interrupt command can be configured to initiate a data flush command to write data from volatile memory components (e.g., the memory cache 212 of FIG. 2) of the data storage devices to persistent data storages (e.g., the persistent data storage 210 of FIG. 2) of the data storage devices. The interrupt command serves to protect loss of data because of the power failure event. In several embodiments, the system-level holdup energy storages 310 and/or the drive-level holdup energy storages 232 of FIG. 2 can be adapted to have sufficient electric charge to sustain the data storage devices until the interrupt command is fully executed.

In some embodiments, the failure event controller 304 can determine a priority sequence of functional components affected by the power failure event. In response, the failure event controller 304 can route the power of the system-level holdup energy storages 310 according to the priority sequence. For example, the failure event controller 304 can prioritize data storage devices that do not have drive-level holdup energy storages over data storage devices having drive-level holdup energy storages. For another example, the failure event controller 304 can prioritize data storage devices storing data known not to be backed-up. For another example, the failure event controller 304 can prioritize data storage devices associated with high-priority external clients.

In some embodiments, the failure event controller 304 is configured to select one or more target storage devices in the multi-storage-device array to send an interrupt command to flush data from their volatile memories to persistent memories. The selection can be based on whether a data storage device has data protection/backup power and/or whether it is affected by the power failure event. The failure event controller 304 can access an inventory record (e.g., collected when an operating system of the multi-storage-device array mounted the data storage device or collected by a firmware when the data storage devices connected to a switching network of the multi-storage-device array) of the attributes of the data storage device to determine whether it has data protection/backup power capability. The failure event controller 304 can determine whether the data storage device is affected by the power failure event by matching an event type of the power failure event against a table describing attributes of power failure event types.

In these embodiments, the backup power circuitry 308 is configured to provide backup power only to the target storage devices. For example, at least some of the electric probes 302 can be storage-drive-specific electric probes electrically coupled respectively to power trains for the storage devices in the multi-storage-device array. The failure event controller 304 can be configured to select the target storage devices based on sensor readings from the storage-drive-specific electric probes. In these embodiments, the failure event controller 304 is configured to shutdown (e.g., via a hard shutdown or a command-based soft shutdown) remaining components in the multi-storage-device array that are not part of the power failure management circuit and the target storage devices. For example, the failure event controller 304 can shutdown the remaining components by issuing a shutdown command signal or by cutting off power supplied (e.g., from the power supply or from the backup power circuitry 308) to the remaining components.

Functional components (e.g., circuits, devices, engines, modules, and data storages, etc.) associated with the multi-storage-device array 100, the data storage device 200, and/or the power failure management circuit 300 can be implemented as a combination of circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 4:
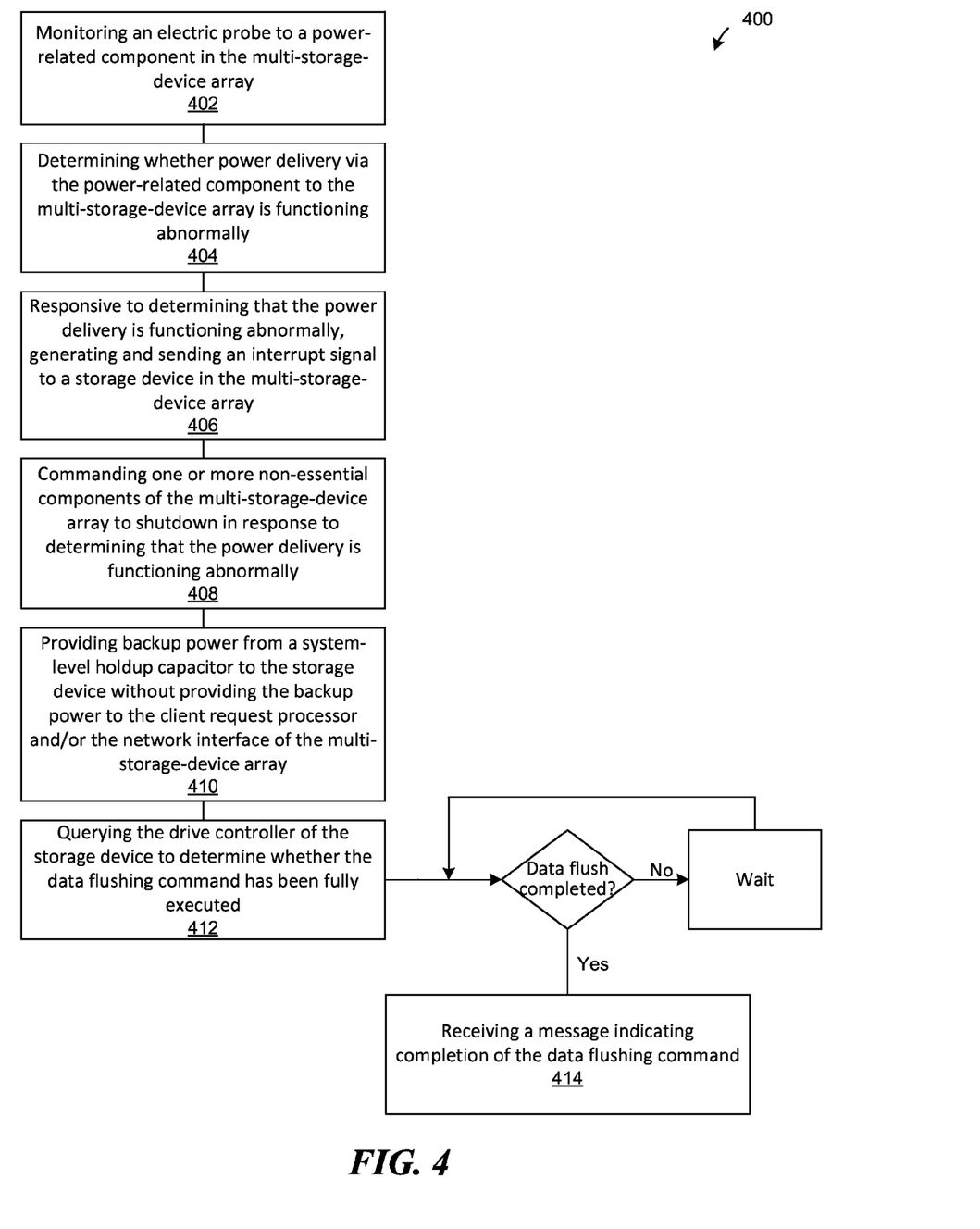
FIG. 4 is a flow chart of a method of data protection responsive to a power failure event in a multi-storage-device array, in accordance with various embodiments.

FIG. 4 is a flow chart of a method 400 of data protection responsive to a power failure event in a multi-storage-device array (e.g., the multi-storage-device array 100 of FIG. 1), in accordance with various embodiments. The method 400 can be executed by a power failure management circuit (e.g., the power failure management circuit 300 of FIG. 3) in the multi-storage-device array. At block 402, the power failure management circuit monitors an electric probe (e.g., a voltage comparator or a current meter) to a power-related component in the multi-storage-device array. The electric probe can be one of the electric probes 302 of FIG. 3. The power-related component can be a power supply (e.g., one of the power supply modules 104 of FIG. 1) for part of or the entire multi-storage-device array (e.g., all active components within the multi-storage-device array). At block 404, the power failure management circuit determines whether power delivery via the power-related component to the multi-storage-device array is functioning abnormally. A power-related component can be deemed "functioning abnormally," when the power related component has an open circuit (e.g., no current on a current meter) or a short-circuit (e.g., no voltage drop across the power-related component's terminals). A power-related component can also be deemed "functioning abnormally," when the power-related component has fluctuating, fluttering, erratic, decreasing, and/or escalating electric current draw and/or voltage difference across the terminals.

Responsive to determining that the power delivery is functioning abnormally, the power failure management circuit generates and sends an interrupt signal to a storage device in the multi-storage-device array at block 406. The interrupt signal can be a data flushing command. For example, the power failure management circuit can send the interrupt signal to a drive controller of the storage device via a storage adapter for the storage device and/or a switching network (e.g., the switching network 126 of FIG. 1). The power failure management circuit can generate the interrupt signal as a highest priority command according to a storage device communication protocol (e.g., SAS protocol or PCIe protocol).

In some embodiments, at block 408, the power failure management circuit commands one or more non-essential components of the multi-storage-device array to shutdown in response to determining that the power delivery is functioning abnormally. For example, this may include shutting down a main processor (e.g., the central processor 122 of FIG. 1) used by the multi-storage-device array to process client requests received from a network interface (e.g., the network interface 120 of FIG. 1) of the multi-storage-device array. For another example, this may include shutting down the network interface. At block 410, the power failure management circuit can provide backup power from a system-level holdup energy storage to the storage device without providing the backup power to the client request processor and/or the network interface of the multi-storage-device array. The backup power can be used by the storage device to execute the data flushing command represented by the interrupt signal.

At block 412, the power failure management circuit can query the drive controller of the storage device to determine whether the data flushing command has been fully executed. At block 414, the power failure circuit can receive a message from the drive controller indicating completion of the data flushing command. In some embodiments, the power failure management circuit can cutoff backup power to the storage device in response to receiving the message indicating the completion of the data flush command.

While processes or blocks are presented in a given order in FIG. 4, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification.

What is claimed is:

1. A computer-implemented method of operating a multi-storage-device array, comprising:
   monitoring an electric probe to a power-related component in the multi-storage-device array;
   determining whether power delivery, via the power-related component, to the multi-storage-device array is functioning abnormally;
   responsive to determining that the power delivery is functioning abnormally, generating an interrupt signal to a storage device in the multi-storage-device array; and
   providing backup power from a system-level holdup energy storage to the storage device without providing the backup power to a client request processor of the multi-storage-device array.

2. The computer-implemented method of claim 1, further comprising, responsive to determining that the power delivery is functioning abnormally, commanding at least one of the client request processor to shutdown.

3. The computer-implemented method of claim 1, wherein generating the interrupt signal includes sending the interrupt signal to a drive controller of the storage device; and wherein the interrupt signal represents a highest priority command for the drive controller according to a storage communication protocol.

4. The computer-implemented method of claim 1, wherein the electric probe is a voltage comparator, and the power-related component is a power supply for components within the multi-storage-device array.

5. A multi-storage-device array comprising:
   multiple storage drives, wherein each of the storage drives includes persistent memory and volatile memory serving as staging area for the persistent memory;
   a central processor to process external client requests to read or write data from at least one of the storage drives;

a central power interface, shared by the storage drives, drawing power from an input power supply to provide power to the storage drives; and a power failure management circuit, coupled to the central power interface and the central processor, having one or more electric probes to determine whether the input power supply is functioning abnormally; and wherein the power failure management circuit is configured to:

send an interrupt signal to a drive controller of a target storage drive to flush data from the volatile memory of the target storage drive to the persistent memory of the target storage drive, responsive to detecting the input power supply is functioning abnormally; and provide power to the multiple storage devices without providing power to a client request processor of the multi-storage-device array.

6. The multi-storage-device array of claim 5, wherein the power failure management circuit includes a satellite controller separate from the central processor; and wherein the satellite controller is configured to detect a power failure event from at least a sensor reading of the electric probes and determine whether to send the interrupt signal to the drive controller to flush the data.

7. The multi-storage-device array of claim 5, wherein the power failure management circuit utilizes the central processor to detect a power failure event from at least a sensor reading of the electric probes and to determine whether to send the interrupt signal to the drive controller to flush the data.

8. The multi-storage-device array of claim 5, wherein the electric probes include a voltage comparator at the input power supply, and wherein the power failure management circuit is configured to detect a change in a voltage drop across terminals of the input power supply or whether the voltage drop exceeds a voltage threshold.

9. The multi-storage-device array of claim 5, wherein the power failure management circuit is configured to determine whether any of one or more powertrains to the storage drives is functioning abnormally.

10. The multi-storage-device array of claim 9, wherein the electric probes include a voltage comparator at a powertrain to a storage drive within the multi-storage-device array, and wherein the power failure management circuit is configured to detect a change in a voltage drop across terminals of the powertrain or whether the voltage drop exceeds a voltage threshold.

11. The multi-storage-device array of claim 5, wherein the electric probes include a current meter at the input power supply, and wherein the power failure management circuit is configured to detect a change in an electrical current drawn from the input power supply or whether the electrical current exceeds a current threshold.

12. The multi-storage-device array of claim 5, wherein the electric probes include a current meter at a powertrain of a storage drive within the multi-storage-device array, and wherein the power failure management circuit is configured to detect a change in an electrical current drawn from the powertrain or whether the electrical current exceeds a current threshold.

13. The multi-storage-device array of claim 5, wherein the power failure management circuit is configured to selectively shutdown a component, other than the target storage drive and the central processor, of the multi-storage-device array while the target storage drive is flushing the data from the volatile memory to the persistent memory.

14. The multi-storage-device array of claim 5, further comprising a system-level holdup energy storage capable of providing power to the target storage drive when the input power supply loses power.

15. A power failure management circuit for executing a data protection command when a power failure event occurs in a multi-storage-device array, comprising:

an electric probe to provide sensor reading from a power-related component;

a satellite controller configured to detect a power failure event in the multi-storage-device array based at least on the sensor reading of the electric probe;

wherein the satellite controller is configured to:

generate an interrupt command to storage devices in the multi-storage-device array to flush data stored in volatile memories of the storage devices to persistent memories of the storage devices; and a backup power circuitry, including one or more holdup energy storages, configured to provide backup power to the storage devices without providing the backup power to a client request processor of the multi-storage-device array, wherein capacitance of the holdup energy storages is sufficient to sustain the storage devices to flush potentially all data from the volatile memories to the persistent memories.

16. The power failure management circuit of claim 15, wherein the electric probe is electrically coupled to a central power supply for the multi-storage-device array; and wherein the satellite controller is configured to send the interrupt command to all of the storage devices in the multi-storage-device array in response to detecting a power failure event utilizing the electric probe.

17. The power failure management circuit of claim 15, wherein the satellite controller is configured to select one or more target storage devices in the multi-storage-device array to send the interrupt command; and wherein the backup power circuitry is configured to provide backup power only to the target storage devices.

18. The power failure management circuit of claim 17, further comprising:

multiple storage-drive-specific electric probes respectively electrically coupled to power trains for storage devices in the multi-storage-device array; and wherein the satellite controller is configured to select the target storage devices based on sensor readings from the storage-drive-specific electric probes.

19. The power failure management circuit of claim 17, wherein the satellite controller is configured to shutdown remaining components in the multi-storage-device array that are not part of the power failure management circuit and the target storage devices by issuing one or more shutdown command signals.

20. The power failure management circuit of claim 17, wherein the satellite controller is configured to shutdown remaining components in the multi-storage-device array that are not part of the power failure management circuit, the target storage devices, and the client request processor by cutting off power supplied to the remaining components.

* * * * *